June 17, 1952 — R. I. N. WEINGART — 2,600,453
METHOD AND APPARATUS FOR CONTROLLING HEAT IN HOT MACHINING PROCESSES
Filed June 25, 1949 — 6 Sheets-Sheet 1

INVENTOR.
RICHARD I. N. WEINGART
BY John P. Chandler
his ATTORNEY.

*INVENTOR.*
RICHARD I. N. WEINGART

June 17, 1952          R. I. N. WEINGART         2,600,453
METHOD AND APPARATUS FOR CONTROLLING HEAT IN
HOT MACHINING PROCESSES
Filed June 25, 1949                           6 Sheets-Sheet 4

INVENTOR.
RICHARD I. N. WEINGART
BY
John P. Chandler
his ATTORNEY.

INVENTOR.
RICHARD L N. WEINGART
BY John P. Chandler
his ATTORNEY.

INVENTOR.
RICHARD I. N. WEINGART
BY John P. Chandler
his ATTORNEY

Patented June 17, 1952

2,600,453

UNITED STATES PATENT OFFICE 2,600,453

METHOD AND APPARATUS FOR CONTROLLING HEAT IN HOT MACHINING PROCESSES

Richard I. N. Weingart, New York, N. Y.

Application June 25, 1949, Serial No. 101,352

20 Claims. (Cl. 219—1)

This invention relates to the art of machining materials to predetermined sizes and shapes by the use of a tool after portions of the material about to be removed have been heated to a temperature below the melting point by the use of a controlled source of heat.

The invention relates more particularly to novel means for controlling the application of heat by utilizing the strain between the tool and the work during the cutting operation.

This invention is a continuation-in-part of a former application filed February 8, 1949, Serial No. 75,158, now abandoned and a continuation-in-part of a second application filed May 10, 1949, Serial No. 92,326, now abandoned.

When portions of a material such as metal about to be removed from the parent body are heated to a desired temperature the shear strength of the metal is reduced and the cutting proceeds with great facility. The temperature will vary with different metals and as the tool becomes more dull more heat must be applied. The use of thermometers and other temperature responsive instruments is completely unsatisfactory since they measure only the temperature at the surface. Moreover, reduction in shear resistance to the tool is the important consideration so that even if the surface temperatures could be accurately measured, and were known, they would still not consistently and accurately reflect shear resistance of the metal to the tool, because of variable factors, such as tool condition, depth of heating, etc.

It has been discovered that the degree of reduction in shear resistance in the material is accurately reflected in the strain on the cutting tool so in one embodiment of the invention a strain gauge is affixed to the tool which measures its bending strains. Heat is applied to the work and the cutting operation commences. When the shear resistance is reduced below a desired optimum value, a control unit connected with the strain gauge reduces the amount of applied heat and the cutting continues until the strain gauge indicates a shear resistance above the desired optimum value at which time the amount of applied heat is increased. In this manner the amount of applied heat is regulated directly by the bending strains on the tool. The variation of the applied heat may be accomplished by a number of controlling structures, several of which will be described in detail hereinafter.

The application of heat to the work to be machined may be made by any of the well known heating methods. It has been found that heating the work by means of a high frequency induction coil is a convenient method which permits of accurate control. Also, heat may be applied by the use of one or more torches and the variation of heat controlled by varying the distance between the work and the torch assembly or by varying the amount of combustible gas fed to the torches.

In either of the above arrangements the heating of the material is accurately and automatically controlled. The control system prevents overheating of the material at the base of the cut which is highly undesirable for a number of reasons including the fact that it sets up metallurgical changes in those portions of the work which remain in the finished product. The control system also prevents underheating which deprives the hot machining process of all its advantages.

Finally the strain control system accomplishes a result which can be accomplished in no other manner and eliminates completely the guesswork which has characterized all hot machining processes in the past.

Figure 1:
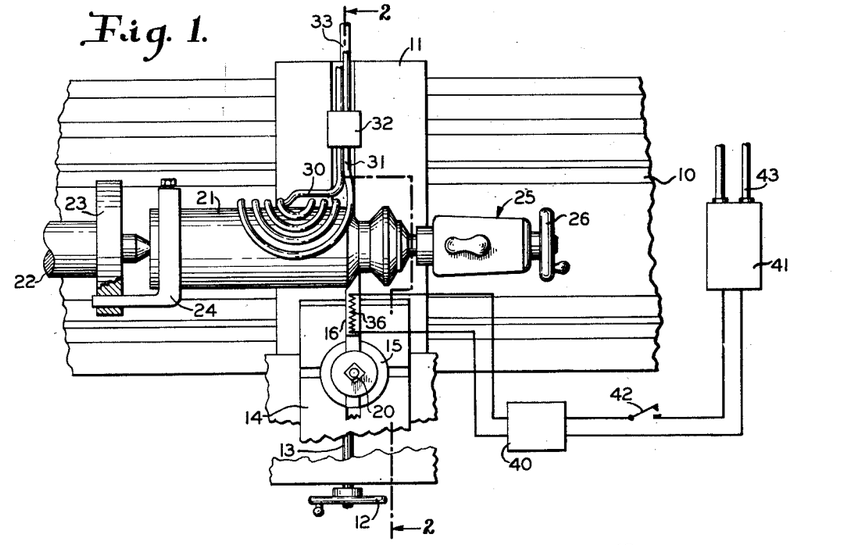
Fig. 1 is a broken top plan view of a lathe showing an application of the present invention.
Figure 2:
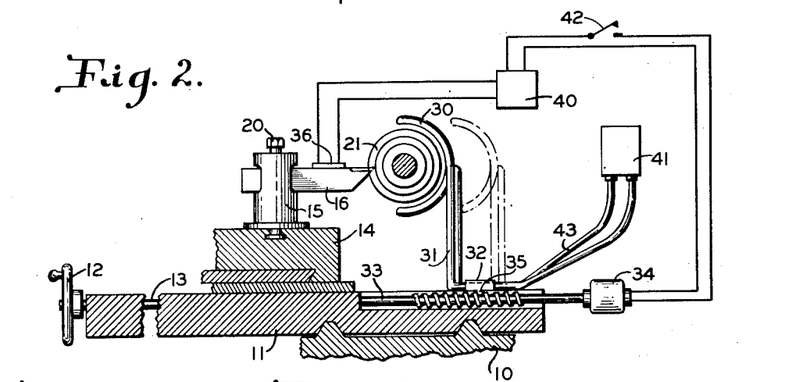
Fig. 2 is a broken section taken along line 2—2 of Fig. 1.

In Figs. 1 and 2 there is shown a lathe including a bed 10 and a carriage 11 which is arranged to be moved longitudinally of the bed by a lead screw (not shown). A hand wheel 12 on shaft 13 is provided for moving a tool support 14 toward and away from the work. The tool support carries a tool post 15 in which the tool 16 is mounted and secured by a set screw 20.

The work or cylindrical blank is shown at 21 and is supported at one end by a headstock assembly 22 which carries a face plate 23 and dog 24. At its opposite end the work is supported by a tail stock assembly 25 provided with a hand wheel 26. All of the foregoing is conventional.

Back of the work and partly enclosing some of its surface is mounted an induction heating coil 30 supported by terminal rods 31. This coil is initially formed as a flat spiral and then bent to a shape which will more efficiently induce currents in the work. The arc of the coil should extend over substantially 180° and should be the arc of a circle having a diameter slightly larger than the diameter of the work. The coil is mounted on a slide 32 mounted for reciprocating movement on the carriage 11. A lead screw 33 journalled on the carriage is driven by a reversible motor 34 (shown in more detail in Figs. 5 and 6), the thread of the screw being engaged by a finger 35 on the slide. This is one convenient means of moving the coil toward and away from the work. In some instances the arcuate coil may be replaced with a more conventional type of coil of helical shape shown in Figs. 3 and 4, which is disposed concentrically of the work.

Upon the upper surface of the tool 16 a strain gauge 36 is mounted, and is included in an electric circuit which controls the position of the coil with reference to the work. One method of control is shown in detail in Fig. 5 and is illustrated in block form in Figs. 1 and 2. It includes a control circuit 40, a preheat switch 42 and the reversible motor 34. In this form of variable distance control the high frequency power is kept at a constant full load value generated by any of the well known generators 41 and connected to the coil 30 by flexible leads 43.

Figure 3:
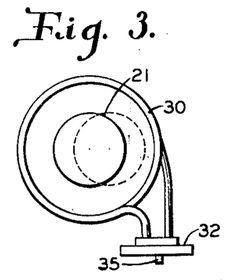
Fig. 3 is an end elevation of a helical heating coil which surrounds the work.
Figure 4:
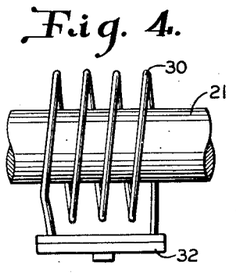
Fig. 4 is a side elevation of the helical coil of Fig. 3.

The type of coil illustrated in Figs. 3 and 4 may also be used with this control arrangement. In Fig. 3 the work 21 is shown concentric with the coil turns at which position it receives the minimum amount of applied heat. When the strain gauge indicates that a higher temperature should be provided the coil base 32 is moved toward the work as indicated by the relative positions of the coil and the work shown in dotted lines. This applies an excess of heat to the portion of the work nearest the coil but since the work is revolving rapidly, the heat is evenly distributed.

Figure 5:
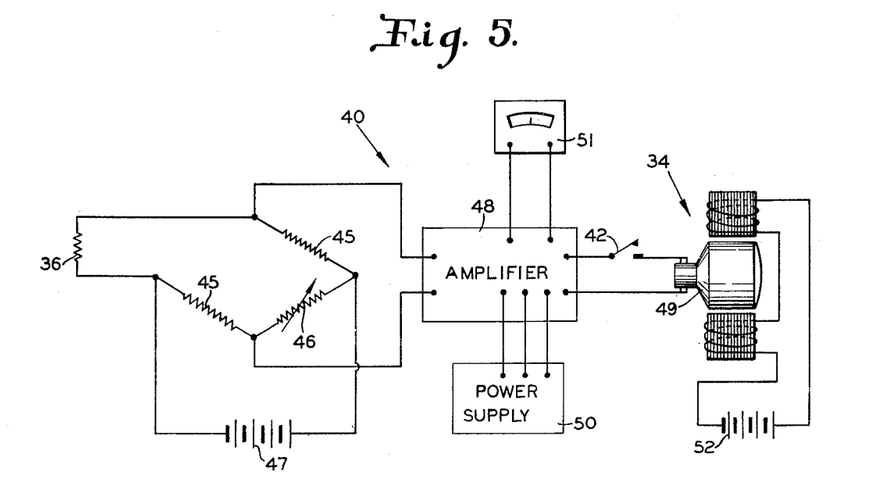
Fig. 5 is a diagram of connections, some of which are shown in block form of a circuit by which a strain gauge may control the position of a heat applicator.

Referring now to Fig. 5 which shows the control circuit 40 in greater detail, the strain gauge 36 is connected in one arm of a conventional Wheatstone bridge arrangement which includes fixed resistor 45 and an adjustable resistor 46. A battery 47 supplies direct current to the bridge and a direct current amplifier 48 of conventional design receives the unbalance voltage as an input and delivers an amplified current to an armature 49 of the reversible motor 34. A power supply 50 and an output meter 51 complete the amplifier circuit. The reversible motor 34 is supplied with a direct current supply 52 for the fields, the value of which is not changed by the control circuit 40.

A source of alternating current may be substituted for the battery 47 and an alternating current amplifier may be substituted for the direct current amplifier 48 provided a rectifier circuit 53 (see Fig. 11) and a direct current balancing circuit 54 be included in the amplifier output.

The operation of the above described structures is as follows: A short time before the cutting operation is to start the high frequency power is turned on with preheat switch 42 open. Since there is no load on the tool the strain gauge will indicate zero strain and the bridge 40 will be unbalanced. The amount of unbalance will be indicated on the output meter 51 and produce a measurable check on the apparatus to show if it is working properly. At this time, the adjustable resistor 46 may be set to determine the desired depth of cut in conjunction with the desired operating temperature. Next, the tool is advanced to the work and the cutting operation started. This puts a strain on the tool which is at once shown on the meter. The depth of cut may be adjusted by this observation. To start the automatic control, the switch 42 is closed and thereafter the amount of heat applied to the work is controlled by the circuit. If the temperature is too low the strain gauge resistance will increase and unbalance the bridge, thereby applying an amplified current to the armature of motor 34 which has been adjusted to move the coil 30 toward the work and increase the temperature to the desired value.

If the temperature of the work is too high, the strain gauge will be lowered in resistance, again unbalancing the bridge but this time in the opposite direction and producing an unbalance voltage of oppositely polarity. The motor 34 will then receive a reverse current and turn in the opposite direction to move the coil away from the work.

Figure 6:
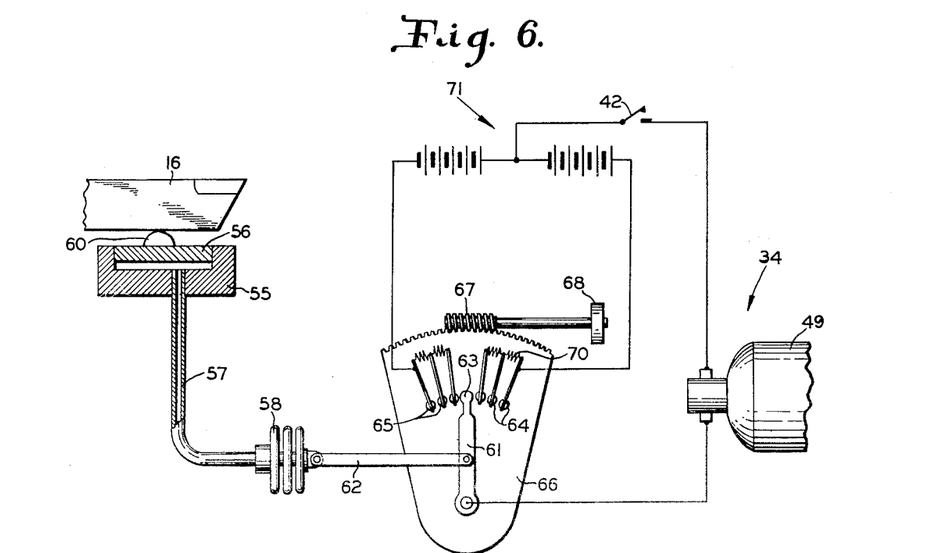
Fig. 6 is a diagram of connections showing how a hydraulic strain gauge may be used to control the position of a heat applicator.
Figure 9:
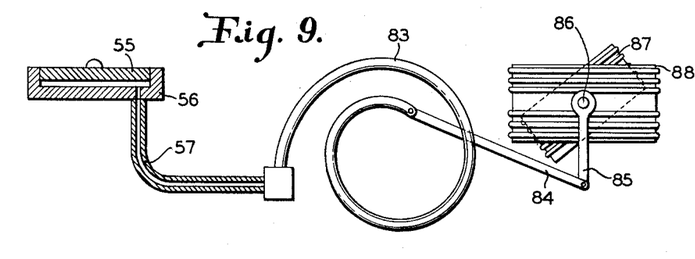
Fig. 9 is a schematic view, partly in section showing how a hydraulic strain gauge may be used to vary the amount of high frequency power derived from an output coil.
Figure 10:
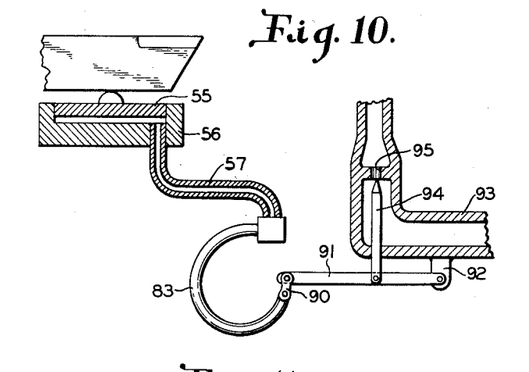
Fig. 10 is a side view, partly in section, showing how a hydraulic strain gauge may be used to control the amount of gas flowing through a conduit.

The control unit illustrated in Fig. 6 makes use of a different form of strain gauge. It comprises a heavy base section 55 and a thinner top plate 56. The two components are sealed where they join, forming a flat disk-like cavity between the plates which is filled with a liquid. A flexible tube 57, also filled with a liquid, is attached to the bottom section and terminates in a pressure measuring element which may be a bellows 58 as shown in Fig. 6 or a Bourdon gauge as shown in Figs. 9 and 10.

At the central portion of the top plate 56 a contact button 60 acts as a partial support for the cutting tool 16. An increase in the shearing load on the tool forces the tool down slightly, flexes the top plate section 56 and forces some of the enclosed liquid out through the tube to operate the gauge element 58.

The control means shown in Fig. 6 includes a rocking contact member 61 operated by a rod 62 attached to the movable end of bellows 58. A contact point 63 moves through an arc to make engagement with a series of spring mounted contact points 64 and 65. The springs which support the contact points are anchored to a movable rocker plate 66, the position of which is made adjustable by a worm gear 67, turned by a knurled hand wheel 68. Between each pair of the right hand springs 64 and the left hand springs 65 a resistor 70 is connected. The end springs of both series are connected to a battery 71 and the center point of the battery is connected to one brush of the armature 49 which is part of the reversible motor 34. The other brush is connected to the contact member 61.

The operation of this control device is as follows: With switch 42 open the high frequency induction coil is set near the work and the power turned on. After a short preheating cycle the tool is advanced to its cutting position and preliminary adjustments of cutting speed, depth of cut, and amount of heat applied are made by hand. Then wheel 68 is turned until the contact 63 is in the central position as indicated by the drawing, making contact with none of the contact springs. Next, the switch 42 is closed and the automatic control operates to adjust the coil position 30 to assure a constant strain on the cutting tool 16.

If the temperature is too low the strain causes a further depression of the liquid in the hydraulic strain gauge 55, 56 and by means of the bellows 58 moves the contact 63 into engagement with the adjacent contact 64. This completes a circuit from the right hand portion of battery 71, through both right hand resistors 70, through the touching contacts to arm 61, over a conductor to one of the brushes in the reversible motor 34. From the other brush the circuit leads through the switch 42 to the center point of the battery 71. If the temperature of the work is so low that a large increase of applied heat is necessary, the arm 61 will be rocked to the right until two or three of the contact points 64 are touching. This action sends current through the motor armature as before but since one or more resistors have been short circuited the current is higher and the automatic control action is faster.

Figure 7:
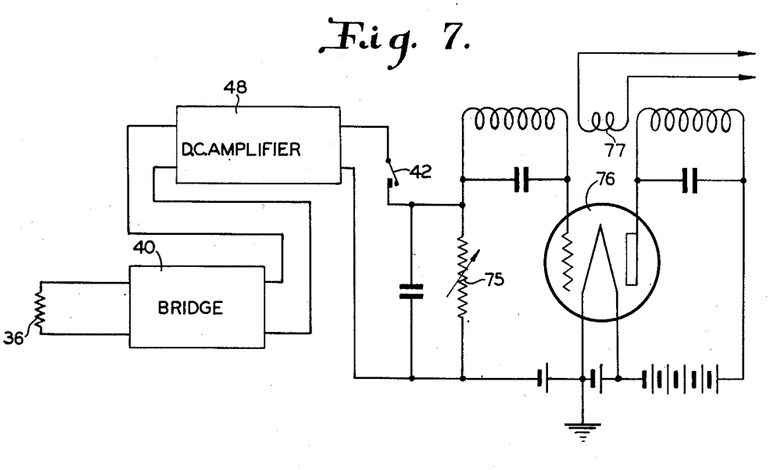
Fig. 7 is a diagram of connections to be used in conjunction with Fig. 5 and illustrates a method of controlling the power input to a high frequency induction coil by the use of a strain gauge. This control method employs no moving mechanical components.

The circuit shown in Fig. 7 illustrates a method of controlling the power input to a high frequency heating coil without the use of mechanical motion. The electrical strain gauge 36, bridge 40, D. C. amplifier 48 are the same as described in Fig. 5. The output of the amplifier is applied to the terminals of a variable resistor 75 in the control electrode circuit of a triode electron discharge device 76 which in this arrangement generates the high frequency power for the induction heating element. The generating circuit may be any of the well known oscillating circuits, the only requirement being that a variation of the potential of the control electrode varies the output power. Such an arrangement is easy to assemble and adjust, the scheme of connections shown in Fig. 7 being one of the simplest circuits.

The operation is as follows: After preliminary adjustments have been made and the pre-heat switch closed, a decrease in the work temperature will cause greater strain on the tool and a subsequent amplified unbalance current applied to the resistor 75. This increases the potential of the control electrode (makes it more positive) and the generator delivers more power to the induction coil, transferred by means of an inductor 77. If the temperature is too high the current applied to resistor 75 causes the control electrode to become more negative and the power output of the generator is reduced. Such a system obviously does not require a coil mount with a movable base.

Figure 8:
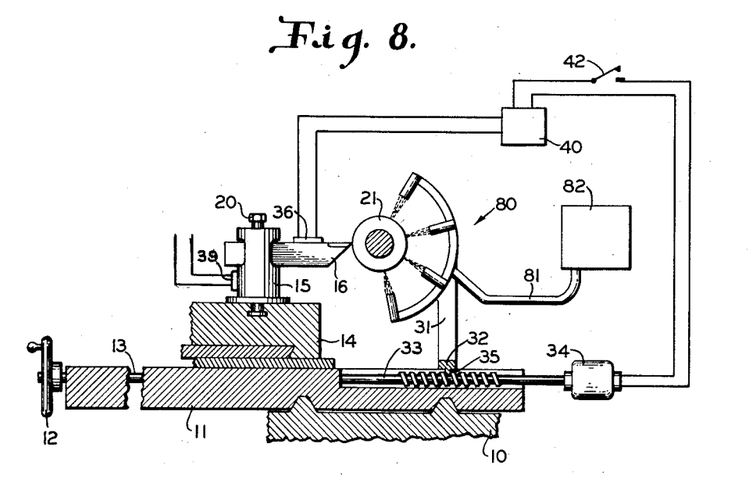
Fig. 8 is a side view, parts of which are in cross section, and shows a lathe using a system of torches as a heating applicator, the application distance of which is controlled by a strain gauge.

The arrangement shown in Fig. 8 is similar to the system shown in Figs. 1 and 2 except that the heating unit is composed of one or more torches 80. The torch units are mounted in an arcuate position around the axis of the work piece 21 and are supplied with the usual combustible materials by means of a flexible hose 81 joined to a supply tank 82. The method of control for the torch arrangement is substantially the same as that described in connection with Figs. 1 and 2 and comprises the usual strain gauge 36, an amplifier 40, and reversible motor 34.

Some installations use a strain gauge 39 mounted on the tool post as indicated in Fig. 8. This arrangement is more convenient as it permits removal of the tool for sharpening without disturbing the strain gauge or its electrical connections. The change in conductivity is less for tool post installations but this condition is rectified by increasing the gain of amplifier 40 to provide the desired output control power.

Fig. 9 illustrates an alternate method of controlling the amount of heat applied to the work by using a hydraulic strain gauge 55, 56 to control the position of a Bourdon tube 83. The movable end of the tube is attached to a link 84 which, in turn, is attached to an arm 85 which is secured to a shaft 86 attached to a rotatable inductance coil 87 which revolves inside a stationary coil 88, the combination comprising an air cored transformer. If the output of the high frequency generator is connected to either one of the coils and the heating coil 30 connected to the other coil, a workable control is effected which varies the heat applied to the work in the same automatic fashion as the other described method. An increase of strain on the tool increases the pressure within the hydraulic strain gauge 55 and 56 thereby causing the Bourdon tube 83 to expand and move the link 84 to the left. This action rotates the movable coil 87 in a clockwise direction, increases the coupling between the coils and delivers more power to the work coil 30, which applies more heat and reduces the cutting shear strength to a workable value.

The arrangement shown in Fig. 10 is used with a torch which uses liquid or gas as fuel. A hydraulic strain gauge 55, 56, a tube 57, and a Bourdon tube is connected to a link 90 and a lever 91 which is pivoted to an extension 92 on the pipe or conduit 93 in which combustible gas or liquid is flowing. A needle 94 is connected to the lever 91 and is operated by it. The upper pointed portion of the needle is directed toward orifice 95 and depending upon the relative position of the orifice and needle point, the gas or liquid flow in the conduit is regulated. Such a control valve may be placed in the conduits which carry the oxygen and the acetylene. In either case a variation of the tool strain causes a variation of the combustible gas flowing to the torch.

Figure 11:
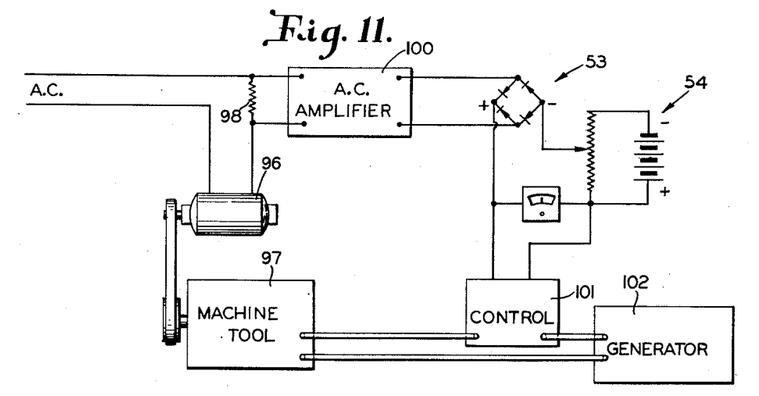
Fig. 11 is a schematic diagram of connections, parts of which are indicated by blocks, of a method of controlling the amount of heat applied to a metal part by using the electrical power input to the driving motor as a means of control.

The arrangement shown in Fig. 11 is somewhat different from the other described arrangements in that no strain gauge on or under the cutting tool is used. In this case the amount of current flowing to a motor 96 which runs a machine tool 97 is a measure of the cutting strains involved. The input current to the motor is measured by inserting a small resistor 98 in the A. C. line. The value of this resistor need not be over ½ ohm. An A. C. amplifier 100 amplifies the voltage across the resistor and applies it to a rectifier 53, the output of which is direct current and may be connected directly to any one of the control devices herein listed and described. In order to provide a null point or a condition of zero current when the heat applied to the work is the right amount, an auxiliary balancing circuit 54 is used. This circuit introduces a potential which is equal and opposite to the output of the rectifier under ideal cutting conditions. Then an increase or decrease in the load current will automatically cause the control unit 101 to vary the amount of applied heat from a generator 102 to restore the desired cutting conditions. Such a device may be used on a milling machine or any other machine tool which uses a revolving cutter. It may also be used on a shaper or any other machine tool using a power drive to cut material.

Figure 12:
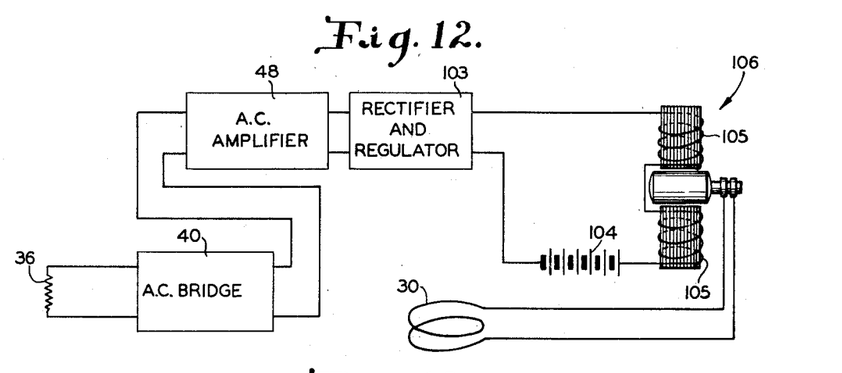
Fig. 12 is a schematic diagram of connections of a control system whereby the strain gauge controls the direct current in the field coils of a high frequency generator.

The arrangement shown in Fig. 12 uses still another system. It can be applied to those installations which use high frequency heating but employ a generator having a D. C. field and a rotating armature. The system includes the usual electrical strain gauge 36 on the tool, an A. C. bridge 40, an A. C. amplifier 48 and a rectifier and current regulator 103. The rectifier component of 103 is the same as the rectifier shown in Fig. 11 or any other suitable device for changing alternating to direct current. The current regulator is similar to one of the regulator devices illustrated and described in Radio Engineers Handbook by F. E. Terman, published by McGraw-Hill Book Co., 1943, pages 614 to 617.

The current which flows from battery 104 through the field coils 105 of the generator 106 is regulated by the variable resistance device in the output circuit of regulator 103. The Wheatstone bridge 40 in this arrangement must be permanently unbalanced so that there is always an unbalance voltage applied to the amplifier 48 and always an output from the amplifier to the rectifier and regulator.

In the operation of this arrangement, the strain gauge may sense an increase of shear strength in the work and increase its resistance. This will throw the bridge further out of balance and produce a larger unbalance voltage at the bridge terminals and also at the terminals of the amplifier 48. When rectified and applied to the control electrodes of a regulator tube more current will flow from the battery 104 through the field coils 105 and an increased amount of high frequency power will be applied to the work.

Figure 13:
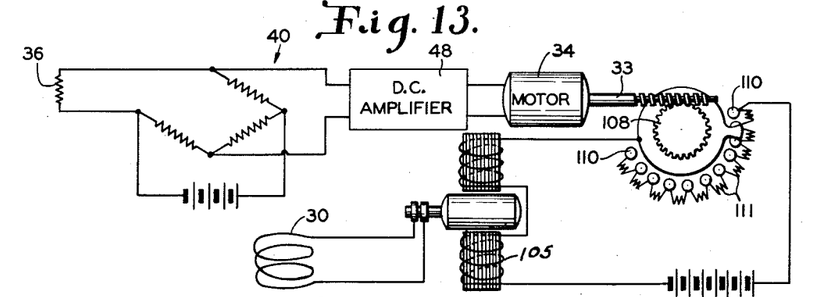
Fig. 13 is another diagram of connections showing how a strain gauge may be used to run a motor to control the arm of a rheostat in the field circuit of an alternating current generator.

The arrangement shown in Fig. 13 is similar to the previously described system except that a reversible motor 34 is employed to change a rheostat 107 in series with a source of direct potential and the generator fields 105. The structure and electrical connections which include the strain gauge 36, bridge 40, amplifier 48, and reversible motor are the same as illustrated and described in connection with Figs. 1 and 2. The motor shaft 33 includes a worm gear which drives a gear 108 secured to a plate which has attached to its periphery a spring-pressed contact finger 109. The finger 109 makes contact with a plurality of studs 110 which are sequentially joined by low value, high current carrying resistors 111.

The operation of the device shown in Fig. 13 is easily understood because it is a combination of the arrangements shown in Fig. 5 and Fig. 12. The strain gauge detects and transmits the variations of shear strength met by the cutting tool and these variations are translated into movements of the contact finger over the rheostat studs. The variation in resistance changes the current in the field current to produce a larger or smaller high frequency current in the heating coil.

Figure 14:
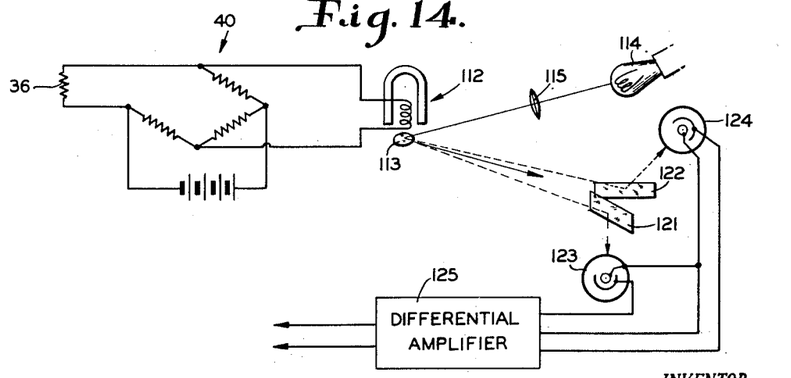
Fig. 14 is another diagram of connections showing how a strain gauge may be used to control the applied heat delivered to a piece of metal to be machined by the use of a sensitive galvanometer and two photoelectric cells.

The arrangement shown in Fig. 14 involves no amplifier between the bridge and the control mechanism. The same strain gauge 36 and bridge 40 are used but the output of the bridge is applied directly to a galvanometer 112 or other sensitive meter with a mirror 113. A source of light 114 produces a beam which is focussed on the mirror by a lens 115 and the reflected beam is directed toward the junction point of two plain stationary mirrors 121 and 122. The rays of light reflected by these mirrors travel to two photoelectric cells 123 and 124. The cells are electrically connected to differential amplifier 125 and to a control circuit (not shown).

The operation is as follows: When the bridge is unbalanced, the unbalance voltage applied to the galvanometer 112 turns the mirror 113 away from its zero position and reflects a greater amount of light into one photocell than into the other. The differential amplifier (push-pull) produces a control current which may be applied to any of the above mentioned control devices to change the amount of heat applied to work in a lathe or other machine tool.

It will be evident from the foregoing description that the strain between the tool and the work may be successfully used in the automatic control of applied heat during the hot machining of material.

Figure 15:
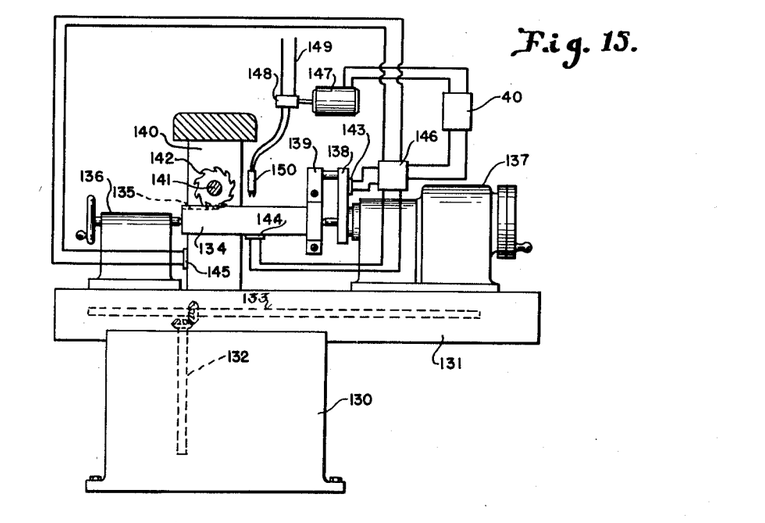
Fig. 15 shows an application of the present invention as applied to a milling cutter wherein a strain gauge is affixed to the work.

In the arrangement shown in Fig. 15 a milling machine is employed and the strain is measured by a strain gauge affixed other to the work handler or to the work. The milling machine illustrated includes a base 130 upon which is mounted a table 131 for sliding longitudinal movement. A drive shaft 132 rotates a lead screw 133 for the purpose of imparting movement to the table. The work 134 may comprise a shaft in which a plurality of longitudinal grooves or keyways 135 are to be machined. The work is supported at one end thereof in a tail stock assembly 136. At the other end a driving head 137 is clamped to the work by clamping elements 138 and 139. A tool post 140 supports a shaft 141 to which is keyed a milling wheel 142.

A strain gauge 143 is mounted on one clamp 138, a second strain gauge 144 is mounted on the work and a third strain gauge 145 is mounted on the tool post. These strain gauges are connected by wires with a switch 146 having suitable means for connecting any one of such strain gauges with the amplifier 40 which is connected with a reversible motor 147 which is arranged to operate a valve 148 similar to that shown in Fig. 10. This valve controls the oxygen and gas passing through conduits 149. 150 is a torch used for heating the work which is suitably mounted in advance of the milling cutter.

In a given installation it will not be necessary to use three strain gauges but more than one may be mounted at suitable locations on the work or the work handler and a selected one used. It will also be appreciated that a strain gauge may be placed at any other suitable position on the work handler or the work and the degree of strain suitably amplified to secure the desired results. The use of a strain gauge on the work as distinguished from the work handler may also be used in connection with any of the induction heating arrangements earlier described.

Figure 16:
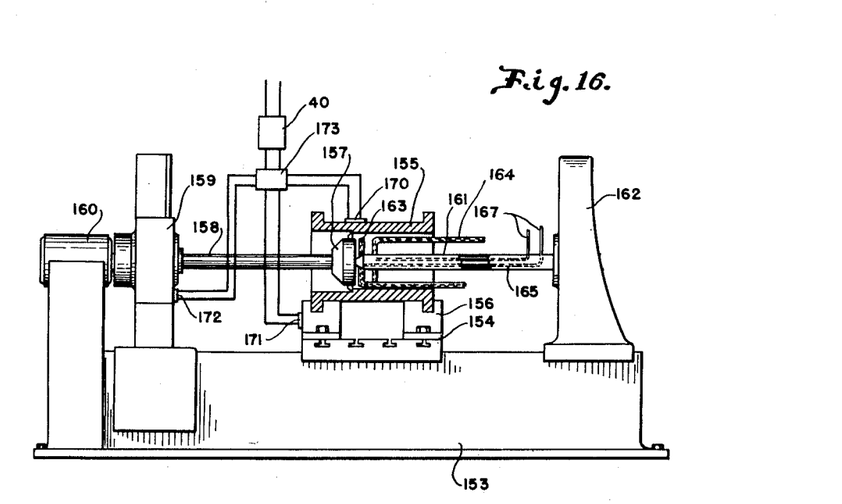
Fig. 16 shows an application of the present invention as applied to a boring operation.

In Fig. 16 a boring machine is shown, the machine including a bed 153 having a table 154 which supports the work 155 by a holding fixture 156. The boring tool 157 is mounted on a spindle 158 journalled in a bearing 159 and is arranged to be driven by a motor 160. A tail stock shaft 161 for supporting the tool is rigidly supported in a tail stock 162. In this instance, heat is applied by an induction coil 163 whose outer periphery is closely spaced from the inner wall of the bore. The terminals 164 of the induction coil are spaced sufficiently from the tail stock shaft to induce only a minimum amount of heat therein. Also, for the purpose of cooling the tail stock shaft, there may be provided channels 165 which receive a fluid coolant fed thereto through conduits 167.

In this instance, a strain gauge 170 is mounted on the work, a second strain gauge 171 is mounted on the holding fixture and a third strain gauge 172 is mounted on the bearing 159 for the tool spindle. All three of these strain gauges are connected with a switch 173 arranged to connect any one of the strain gauges with the amplifier 40 which is employed to control the application of heat in any of the ways previously described. Here again the location of the strain gauge is suggestive only and only one gauge may be used at any one time.

The expression "applied heat" as used in the appended claims is deemed to include instances wherein there is an actual application of heat to the material from an outside heating source such as a torch as well as instances wherein heat is induced in the material by electrical means such as a high frequency induction system or by electrical resistance means.

While there have been described several forms of the invention it is understood that any combinations of the above described arrangements come within the scope of the invention which should be limited only by the appended claims.

What I claim is:

1. In the art of hot machining of materials to predetermined shapes on a work handler provided with a power drive, by reducing the shear strength of the material through heating and then removing portions of the material so heated by the use of a cutting tool, the method which consists of effecting an increase of applied heat to the material when the strain imposed on at least one of said elements increases, as indicated by a strain controlled regulator which is actuated by the strain imposed between the tool and the material, and effecting a decrease of applied heat to the material when such strain decreases.

2. In the art of machining materials to predetermined shapes by reducing the shear strength of the material through heating by the use of controlled applied heat which heats portions of the material, and then removing portions of the material so heated by the use of a cutting tool, the method which consists of effecting an increase of applied heat to the material when the strain imposed on at least one of said elements increases the shear resistance of the material, as indicated by a strain gauge on at least one of said elements which is actuated by the strain imposed between the tool and the material, and effecting a decrease of applied heat to the material when the strain gauge indicates a decrease in shear resistance.

3. In the art of machining materials to predetermined shapes by reducing the shear strength of the material through heating by the use of controlled applied heat which heats portions of the work and then removing portions of the work so heated by the use of a cutting tool, the method which consists of applying a strain gauge to the cutting tool to provide an indication of the strain imposed thereon, reducing the distance between a source of applied heat and the work when the strain gauge indicates an increase in shear resistance, and increasing the distance between the source of applied heat and the work when the strain gauge indicates a decrease in shear resistance.

4. In the art of machining materials to predetermined shapes by reducing the shear strength of the material through heating by the use of a high frequency induction coil which surrounds the work and heats portions about to be removed by a cutting tool, means for controlling the application of heat comprising a control circuit which includes a strain gauge mounted on the tool and a reversible motor, operation of the motor being controlled by the influence of the strain gauge on the circuit, and mechanical means for moving the induction coil further from the work to a position where the applied heat is decreased.

5. In the art of machining materials to predetermined shapes by reducing the shear strength of the material through heating by the use of a high frequency induction coil which heats portions of the work about to be removed by a cutting tool, means for controlling the application of heat comprising a strain gauge mounted on the cutting tool, a Wheatstone bridge for determining the variations in resistance of the strain gauge, an amplifier for receiving the unbalance voltage from the bridge and transmitting power currents to a reversible motor, and mechanical adjusting means operated by the reversible motor for moving the induction coil closer to the work when the strain gauge indicates an increase of shearing resistance and farther from the work when the strain gauge indicates a reduction of shearing resistance.

6. In the art of machining materials to predetermined shapes by reducing the shear strength of the material through heating by the use of an adjustable heat applicator which heats selected portions of the work to be removed by a cutting tool, means for controlling the application of heat comprising a strain gauge mounted on the tool assembly, circuit responsive means connected to the strain gauge for delivering a positive voltage to a reversible motor when the tool assembly is strained less than a predetermined value, and for delivering a negative voltage to the reversible motor when the tool assembly is strained more than the predetermined value.

7. In the art of machining materials to predetermined shapes by reducing the shear strength of the material through heating by the use of an adjustable heat applicator which heats selected portions of the work to be removed by a cutting tool, means for controlling the application of heat comprising a hydraulic strain gauge mounted under a portion of the cutting tool, a pressure responsive indicating device for transmitting variations in tool strain into linear mechanical motion, a plurality of electrical contact members operated by the pressure responsive indicating device, a series of resistance elements connected between the contact members, and circuit means including a battery and a reversible motor in series with the contact members for positioning the adjustable heat applicator in accordance with the variations in tool strain.

8. In the art of machining materials to predetermined shapes by reducing the shear strength of the material through heating by the use of an induction heating coil which heats selected portions of the work to be removed by a cutting tool, means for controlling the power delivered to the induction coil for controlling the application of heat comprising an electric strain gauge mounted on the tool assembly, an alternating current generator having a rotating armature and a field supplied by direct current power, electric responsive means for transmitting strain variations from the strain gauge to a regulator circuit in series with the generator field supply for varying the power output of the generator, and circuit means for transmitting the generator power to the induction coil.

9. In the art of machining materials to predetermined shapes by reducing the shear strength of the material through heating by the use of an induction heating coil which heats selected portions of the work to be removed by a cutting tool, means for controlling the power delivered to the induction coil for controlling the application of heat comprising an electric strain gauge mounted on the tool assembly, an alternating current generator having a field supplied by direct current power, electric responsive means for transmitting strain variations from the strain gauge to a reversible motor coupled to a variable resistor in the generator field supply circuit for varying the power output of the generator, and circuit means for transmitting the generator power to the induction coil.

10. In the art of machining materials to predetermined shapes by reducing the shear strength of the material through heating by the use of controlled applied heat which heats portions of the work and then removing portions of the work so heated by the use of a tool, the method which consists in controlling the application of heat by changing the distance between an induction heating coil and the work, measuring the strain between the cutting tool and the work by means of a strain gauge mounted on the cutting tool, decreasing such distance as the strain increases and increasing it as the strain decreases.

11. In the art of machining materials to predetermined shapes by reducing the shear strength of the material through heating by the use of controlled applied heat which heats portions of the material and then removing portions of the material so heated by the use of a cutting tool, the method which consists of applying a strain gauge to at least one of such elements to provide an indication of the strain imposed thereon, effecting an increase of applied heat to the material when the strain gauge indicates an increase in shear resistance, and effecting a decrease of applied heat to the material when the strain gauge indicates a decrease in shear resistance of the material.

12. In the art of machining materials to predetermined shapes on a work handler provided with a power drive, by reducing the shear strength of the material through heating by the use of controlled applied heat which heats portions of the material and then removing portions of the material so heated by the use of a cutting tool, the method which consists of using a strain gauge on the material to provide an indication of the strain imposed between the tool and the material, effecting an increase of applied heat to the material when such strain increases, and effecting a decrease of applied heat to the material when such strain decreases.

13. In the art of machining materials to predetermined shapes on a work handler provided with a power drive by reducing a shear strength of the material through heating by the use of controlled applied heat which heats portions of the material and then removing portions of the material so heated by the use of a cutting tool, the method which consists of using the strain imposed on the power drive to control the input of the heat to the material, effecting an increase of applied heat to the material when such strain increases, and effecting a decrease of applied heat to the material when such strain decreases.

14. In the art of machining metal to predetermined shapes by reducing the shear strength of the metal through heating by the use of an induction heating coil which heats selected portions of the work to be removed by an edged cutting tool, means for controlling the power delivered to the induction coil for controlling the application of heat comprising an electric strain gauge mounted on the tool assembly, an alternating current generator having a field supplied by direct current power, electric responsive means for transmitting strain variations from the strain gauge to a regulator circuit in series with the generator field supply to increase the field current when the strain gauge increases its resistance and to decrease the field current when the strain gauge decreases its resistance, and circuit means for transmitting the generator power to the induction coil.

15. In the art of machining materials to predetermined shapes by reducing the shear strength of the material through heating by the use of a high frequency induction coil which heats portions of the material about to be removed by a cutting tool, means for controlling the application of heat comprising a strain gauge mounted on the tool, a lead screw arranged, upon rotation, to move the coil towards and away from the material, a reversible motor for rotating the lead screw, a circuit including the strain gauge and the motor, operation of the motor being controlled by the influence of the strain gauge on the circuit and being arranged to move the coil closer to the work when the shear strength of the material increases and further from the work as such strength decreases.

16. In the art of machining materials to predetermined shapes by reducing the shear strength of the material through heating by the use of controlled applied heat which heats portions of the material and then removing portions of the material so heated by a work handler provided with a cutting tool, means for controlling the application of heat comprising a strain gauge affixed to the material, a reversible motor connected with the source of heat, a circuit including the strain gauge and the motor, whereby more heat is applied to the material as the shear strength thereof increases and less heat is applied as the shear strength decreases.

17. The means defined in claim 16 but wherein the strain gauge is affixed to the work handler instead of the material.

18. In the art of machining materials to predetermined shapes by reducing the shear strength of the material through heating by the use of controlled applied heat which heats portions of the material and then removing portions of the material so heated by a work handler provided with a cutting tool, means for controlling the application of heat comprising a strain gauge affixed to the material, a circuit including the source of heat and the strain gauge, and a circuit breaker arranged to close the circuit as the shear strength of the material increases and open the circuit as such shear strength decreases.

19. The means defined in claim 18 but wherein the strain gauge is affixed to the work handler instead of the material.

20. In the art of machining materials to predetermined shapes by reducing the shear strength of the material through heating by the use of a high frequency induction coil which heats portions of the work about to be removed by a cutting tool, means for controlling the application of heat comprising a strain gauge mounted on one of the elements to provide an indication of the strain imposed between the cutting tool and the material and means for effecting an increase of applied heat to the material when the strain gauge indicates an increase in shear resistance of the material, such means comprising a circuit including the strain gauge and the heating element.

RICHARD I. N. WEINGART.

REFERENCES CITED

The following references are of record in the file of this patent:

UNITED STATES PATENTS

| Number | Name | Date |
|---|---|---|
| Re. 23,092 | Berliner | Mar. 22, 1949 |